United States Patent
Kim

(10) Patent No.: US 12,494,569 B2
(45) Date of Patent: Dec. 9, 2025

(54) RADAR APPARATUS

(71) Applicant: HL KLEMOVE CORP., Incheon (KR)

(72) Inventor: Sang-Min Kim, Gyeonggi-do (KR)

(73) Assignee: HL KLEMOVE CORP., Incheon (KR)

(*) Notice: Subject to any disclaimer, the term of this patent is extended or adjusted under 35 U.S.C. 154(b) by 397 days.

(21) Appl. No.: 17/993,975

(22) Filed: Nov. 24, 2022

(65) Prior Publication Data

US 2023/0178885 A1    Jun. 8, 2023

(30) Foreign Application Priority Data

Dec. 2, 2021    (KR) .................. 10-2021-0170966

(51) Int. Cl.
| | | |
|---|---|---|
| *H01Q 1/42* | (2006.01) | |
| *G01S 13/931* | (2020.01) | |
| *H01Q 1/32* | (2006.01) | |

(52) U.S. Cl.
CPC ............ *H01Q 1/42* (2013.01); *G01S 13/931* (2013.01); *H01Q 1/32* (2013.01)

(58) Field of Classification Search
CPC .......... H01Q 1/42; H01Q 1/32; H01Q 1/521; H01Q 1/3233; G01S 13/931; G01S 7/027; G01S 13/02; G01S 7/032; H05K 9/002; H05K 1/0254
See application file for complete search history.

(56) References Cited

U.S. PATENT DOCUMENTS

| | | | |
|---|---|---|---|
| 10,775,477 B2 * | 9/2020 | Park | G01S 7/032 |
| 2016/0268693 A1 * | 9/2016 | Ding | H01Q 1/526 |

FOREIGN PATENT DOCUMENTS

| | | | | |
|---|---|---|---|---|
| CN | 112398497 A | * | 2/2021 | ............. H04B 15/02 |
| CN | 212519863 | | 2/2021 | |
| EP | 1641074 A1 | * | 3/2006 | ........... H01Q 9/0407 |
| KR | 20100115069 A | * | 10/2010 | ........... H05K 9/0035 |
| KR | 10-2020-0058661 | | 5/2020 | |

OTHER PUBLICATIONS

Office Action dated Feb. 3, 2025 for Korean Patent Application No. 10-2021-0170966 and its English translation from Global Dossier.

* cited by examiner

*Primary Examiner* — Robert W Hodge
*Assistant Examiner* — Bongani Jabulani Mashele
(74) *Attorney, Agent, or Firm* — WOMBLE BOND DICKINSON (US) LLP

(57) ABSTRACT

A radio detection and ranging (radar) apparatus may include an antenna including a plate-shaped circuit board having one surface provided with a first element and a second element mounted thereon to transmit or receive radio waves, a radome configured to cover the one surface of the circuit board and including a protrusion protruding from an inner surface thereof at a side towards the circuit board, a shield configured to cover the first element and including a coupler that is detachably coupled to the protrusion, and a case coupled to the radome to cover the other surface of the circuit board.

20 Claims, 8 Drawing Sheets

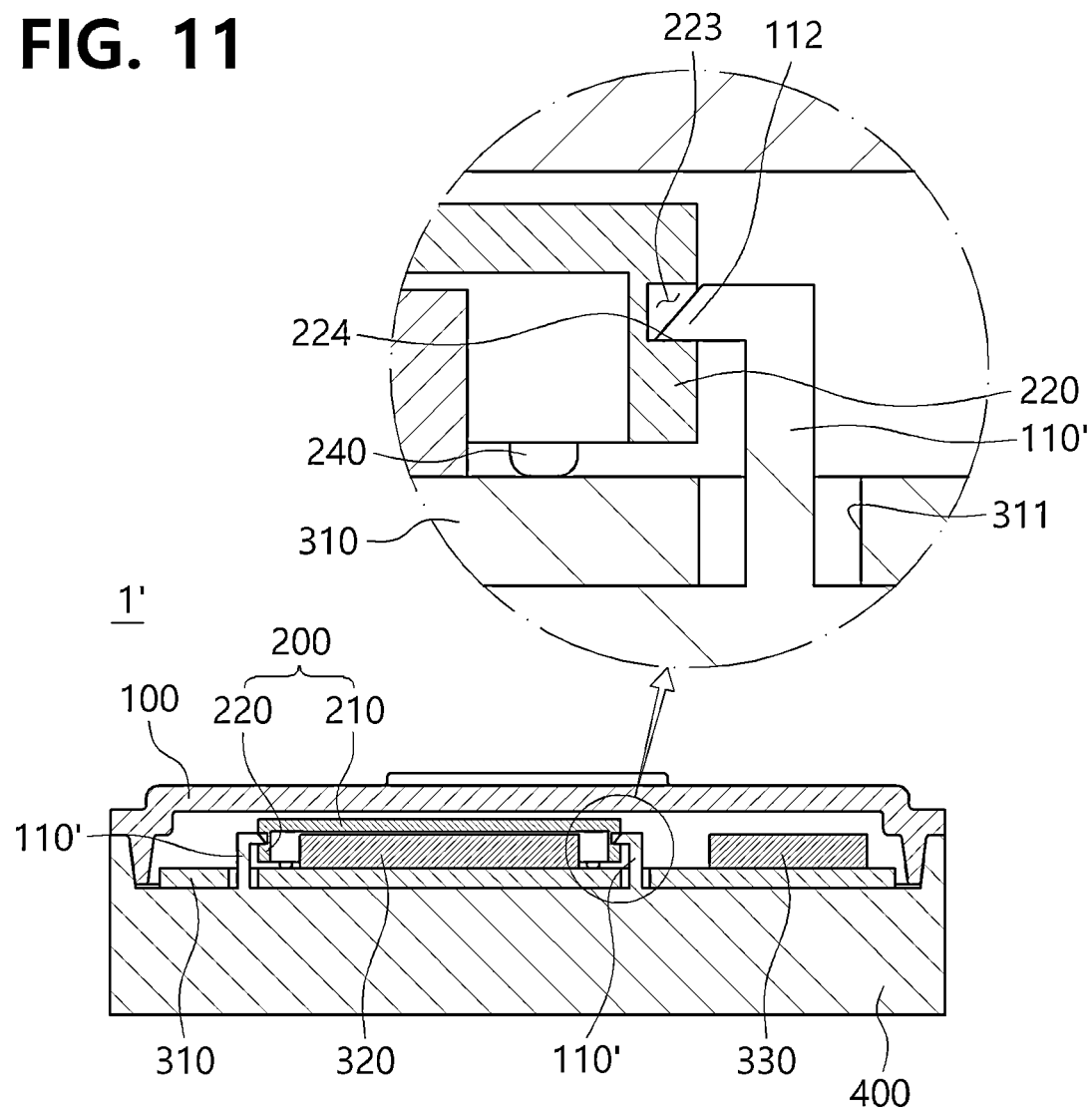

RADAR APPARATUS

CROSS-REFERENCE TO RELATED APPLICATION

This application claims priority to and the benefit of Korean Patent Application No. 10-2021-0170966, filed on Dec. 2, 2021, the disclosure of which is incorporated herein by reference in its entirety.

BACKGROUND

1. Technical Field

The present disclosure generally relates to a radio detection and ranging (radar) apparatus, and more particularly, to a radar apparatus in which a shield capable of blocking or absorbing radio waves is coupled to an inside of a radome.

2. Discussion of Related Art

A radio detection and ranging (radar) apparatus may be a detection apparatus that uses radio waves to measure the distances, directions, angles, and speed of objects. The principle of the radar apparatus is to emit strong electromagnetic waves at a determined position and measure the distances, directions, angles, and speeds of objects based on the comparison of a reflected or re-emitted signal with a reference signal.

Recently, such a radar apparatus has been used as an accident prevention system which is provided in a vehicle to aid a driver to prevent accidents or control the vehicle. A vehicle radar apparatus is used to recognize vehicles or objects on the road, collect data such as distances to the vehicles or objects, relative speeds, directions, etc., and control a constant driving speed of a controlled target vehicle or maintain inter-vehicle distances to other vehicles using the collected data.

SUMMARY

The present disclosure is directed to solving the above problems and providing a radio detection and ranging (radar) apparatus in which a shielding plate is easily installed on a radome.

The present disclosure is also directed to providing a radar apparatus in which manufacturing time and manufacturing cost are reduced by simplifying a coupling structure of a shielding plate and the radar apparatus.

Objects of the present disclosure are not limited to the above-described object and other objects that are not described may be clearly understood by those skilled in the art from the following descriptions.

According to an aspect of the present disclosure, there is provided a radar apparatus including an antenna including a plate-shaped circuit board having one surface provided with a first element and a second element mounted thereon to transmit or receive radio waves, a radome configured to cover the one surface of the circuit board and including a protrusion protruding from an inner surface thereof, a shield configured to cover the first element and including a coupler that is detachably coupled to the protrusion, and a case coupled to the radome to cover the other surface of the circuit board.

In this case, the shield may include a plate-shaped shielding plate and a sidewall which protrudes from a periphery of the shielding plate to one side of the shielding plate to form an accommodating space at the one side of the shielding plate, wherein the coupler is formed on an outer circumferential surface of the sidewall.

In this case, the first element may be disposed inside the accommodating space and the second element may be disposed outside the accommodating space.

In this case, the coupler may include an elastic body which is formed on an outer surface of the sidewall to correspond to a position of the protrusion and which elastically presses the protrusion toward the sidewall.

In this case, the protrusion and the coupler may be formed as at least one pair of protrusions and at least one pair couplers, the one pair of protrusions may each be disposed on one of two sides of the sidewall, and the one pair of couplers may each be disposed to correspond to positions of the one pair of protrusions and may each be formed on one of the two sides of the sidewall to face each other.

In this case, the elastic body may protrude from the sidewall and may be formed to be bent in one direction, and the protrusion may move in a direction opposite to the one direction and may be disposed between the elastic body and the outer surface of the sidewall.

In this case, the protrusion may include a protrusion guide surface which is formed to guide the protrusion between the elastic body and the outer surface of the sidewall when the protrusion moves in the direction opposite to the one direction.

In this case, the coupler may further include a fixing protrusion protruding from a front end of the elastic body toward the sidewall.

In this case, the fixing protrusion may include a fixing protrusion guide surface configured to guide the protrusion.

In this case, the coupler may further include a first stopper protruding from the outer surface of the sidewall toward the elastic body to limit a moving distance when the protrusion moves in the direction opposite to the one direction.

In this case, the coupler may further include a second stopper configured to support an end surface of the protrusion which is positioned at a side towards the shield side.

In this case, the second stopper may extend from the first stopper in the one direction.

In this case, the second stopper may be formed to have a length from the shielding plate to the second stopper, which is shorter than a length from the inner surface of the radome to the end surface of the protrusion which is positioned at the side towards the shield so that the shielding plate is spaced a predetermined distance from the inner surface of the radome.

In this case, the shield may further include a support protrusion protruding from an end portion of the sidewall, which is positioned at a side of the circuit board, toward the circuit board to support the circuit board.

In this case, the support protrusion may be formed to have a cross-sectional area reduced toward the circuit board.

In this case, the support protrusion may be in contact with a ground terminal formed in the antenna.

In this case, the first element may be a radio-frequency integrated circuit (RFIC) chip.

According to another aspect of the present disclosure, there is provided a radar apparatus including an antenna including a plate-shaped circuit board having a through-hole formed therein and one surface provided with a first element and a second element mounted thereon to transmit or receive radio waves, a radome configured to cover the one surface of the circuit board, a case coupled to the radome to cover the other surface of the circuit board and including a protrusion which protrudes from an inner surface of the case and passes through the through-hole, and a shield which covers the first element and is detachably coupled to the protrusion.

In this case, the shield may include a plate-shaped shielding plate, and a sidewall which protrudes from a periphery of the shielding plate to one side of the shielding plate to form an accommodating space at the one side of the shielding plate, wherein an engaging surface is formed on an outer circumferential surface of the sidewall, wherein the protrusion is disposed on an outside of the sidewall and includes an engaging unit which is formed at a front end of the protrusion to protrude toward the sidewall to be supported by the engaging surface.

In this case, the engaging surface may be formed as one surface of an engaging protrusion protruding from the sidewall or may be formed as one inner surface of an engaging groove recessed from the sidewall.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 11 is a cross-sectional view illustrating another example of a structure in which a shield of a radar apparatus is coupled to a case according to another embodiment of the present disclosure.

DETAILED DESCRIPTION OF EXEMPLARY EMBODIMENTS

Figure 1:
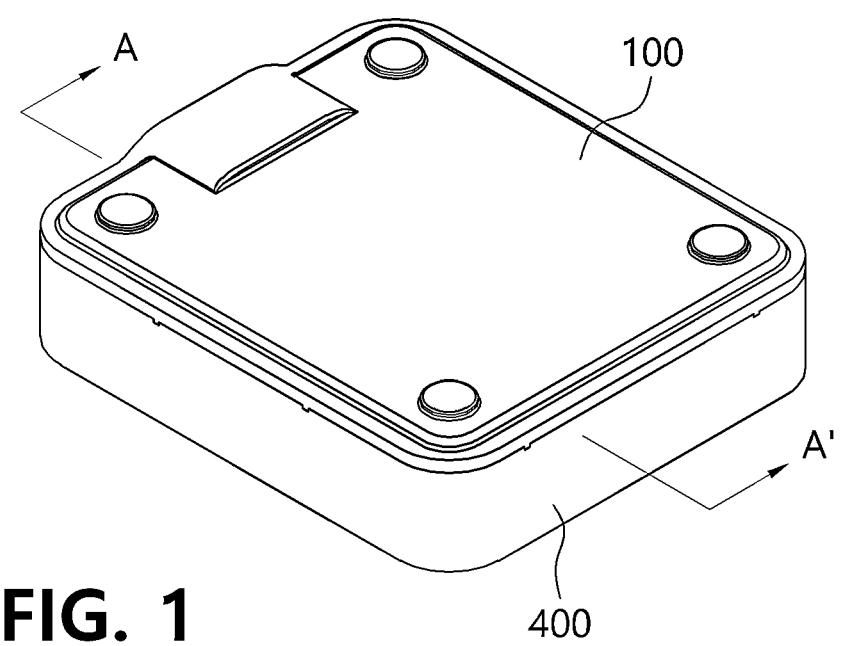
FIG. 1 is a perspective view of a radio detection and ranging (radar) apparatus according to an embodiment of the present disclosure.

Hereinafter, embodiments of the present disclosure that can be easily performed by those skilled in the art will be described in detail with reference to the accompanying drawings. However, the embodiments of the present disclosure may be implemented in several different forms and are not limited to the embodiments described herein. Unless otherwise defined, terms used in the embodiments of the present disclosure may be interpreted as meanings commonly known to those skilled in the art.

In order to clearly express the characteristics of a component in the drawings, thickness or size is exaggerated, and a thickness or size of the component illustrated in the drawings is not shown as in reality. In addition, parts irrelevant to description are omitted in the accompanying drawings in order to clearly explain the present invention. Similar parts are denoted by similar reference numerals throughout this specification.

Hereinafter, when a component is referred to as being "connected" to another component, the description includes the meaning of a component being directly connected to another component or a component being indirectly connected to another component through still another component.

The present disclosure relates to a radio detection and ranging (radar) apparatus, and more particularly, to a radar apparatus in which a shield capable of blocking or absorbing radio waves is coupled to an inside of a radome.

In particular, the present disclosure provides a radar apparatus in which, by providing a coupler that allows a shield to be easily coupled to an inside of a radome, a separate coupling component, for example, a screw or equipment, is not provided, and thus manufacturing time and manufacturing cost can be reduced.

Figure 2:
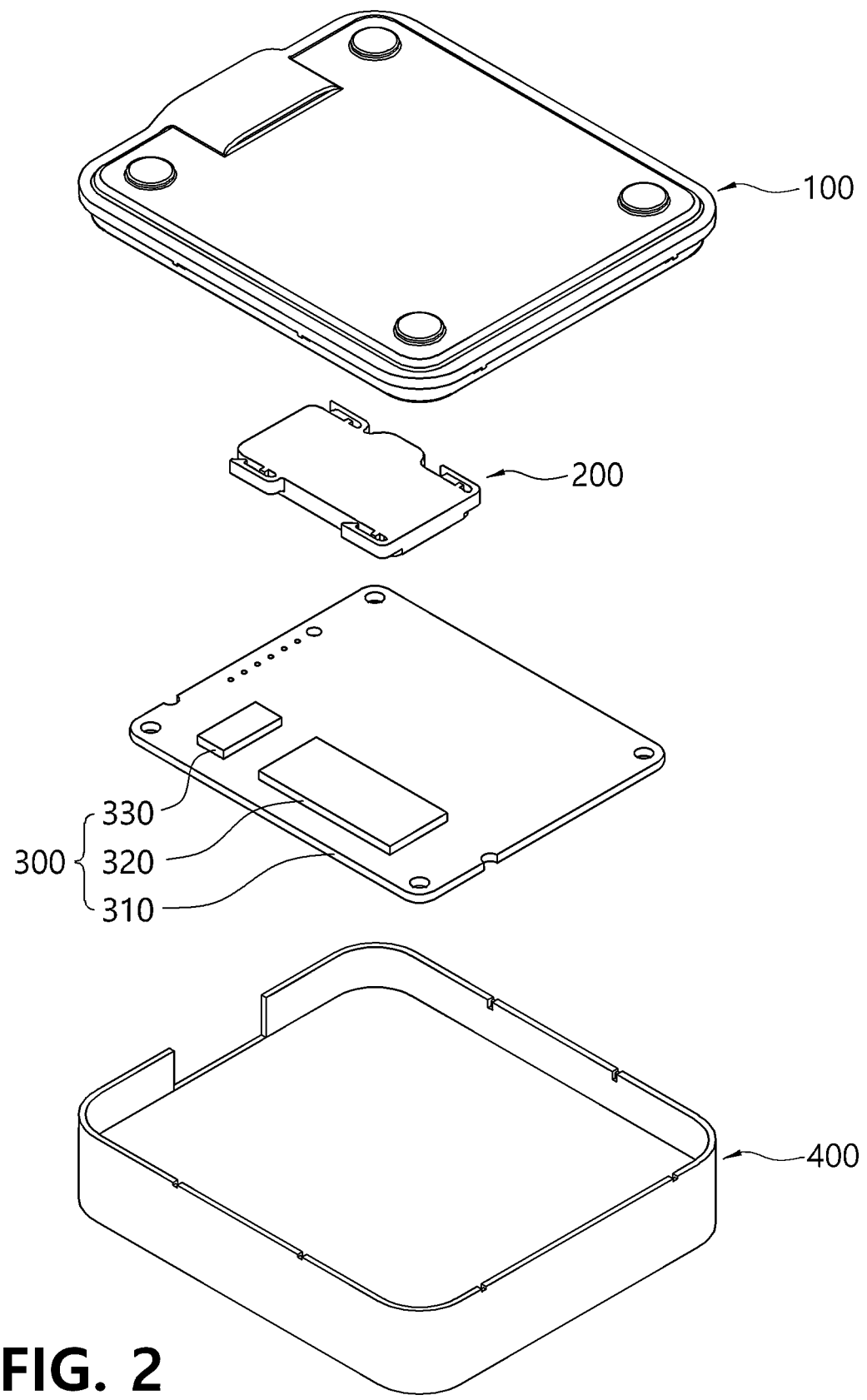
FIG. 2 is one exploded perspective view of the radar apparatus according to the embodiment of the present disclosure.
Figure 3:
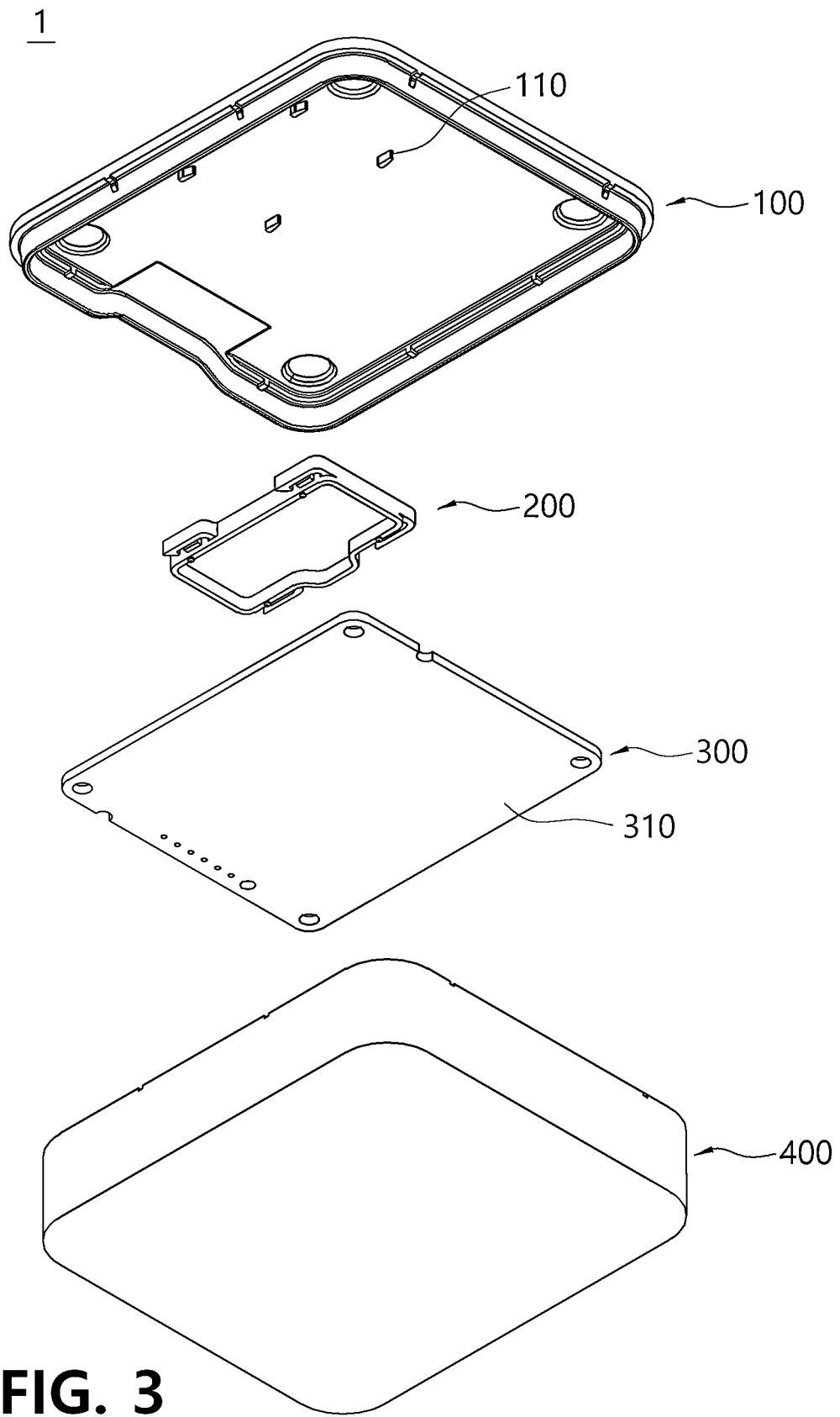
FIG. 3 is another exploded perspective view of the radar apparatus according to the embodiment of the present disclosure.

FIG. 1 is a perspective view of a radar apparatus according to an embodiment of the present disclosure. FIG. 2 is one exploded perspective view of the radar apparatus according to the embodiment of the present disclosure. FIG. 3 is another exploded perspective view of the radar apparatus according to the embodiment of the present disclosure.

Referring to FIGS. 1 to 3, a radar apparatus 1 according to an embodiment of the present disclosure may include a radome 100, a shielding structure or a shield 200, an antenna module 300, and a case 400.

As illustrated in FIGS. 1 to 3, the radome 100 and the case 400 are formed to have, for example, but not limited to, a box shape having an internal space formed when the radome 100 and the case 400 are coupled. The radome 100 and the case 400 are detachably formed, and there is no limitation on a shape the internal space formed by the radome 100 and the case 400.

The radome 100 protects the antenna module 300 to be described below from an external environment. In this embodiment, since radio waves are transmitted or received through the radome 100, the radome 100 may be formed of a material capable of minimally attenuating a transmitted or received electromagnetic signal.

As illustrated in FIG. 3, protrusions 110 protruding toward the case 400 are provided on an inner surface of the radome 100. In this embodiment, the protrusions 110 may serve to couple the shield 200 to the radome 100, and a description thereof will be given below together with the shield 200.

The antenna module 300 is configured to transmit or receive radio waves to measure a distance of an objection, a direction of an object, and the like. To this end, the antenna module 300 includes a circuit board 310, a first antenna element 320, and a second antenna element 330, as illustrated in FIGS. 2 and 3.

The circuit board 310 may be, for instance, but not limited to, a plate-shaped printed circuit board. The circuit board 310 is fixed to an internal space formed by the radome 100 and the case 400. In this embodiment, the circuit board 310 may be fixed to an inner surface of the case 400 or may be fixed to the inner surface of the radome 100.

The first antenna element 320 and the second antenna element 330 are disposed or mounted on one surface of the circuit board 310 facing the radome 100. The first antenna element 320 and the second antenna element 330 are configured to transmit or receive radio waves for operation of the radar apparatus 1.

In this embodiment the first antenna element 320 is configured to transmit or receive information between the radar apparatus 1 and an external device. For example, the first antenna element 320 may be a radio-frequency integrated circuit (RFIC) chip, a near field communication (NFC) chip, a global positioning system (GPS) chip, a wireless fidelity (WiFi) chip, a Bluetooth chip, a Wideband Code Division Multiple Access (WCDMA) chip, a Long-Term Evolution (LTE) chip or a 5G New Radio (NR) chip.

The second antenna element 330 is configured to transmit or receive radio waves which can be used by the radar apparatus 1 to measure the distance and the direction of the object. For example, the second antenna element 330 may be a radio-frequency integrated circuit (RFIC) chip, a near field communication (NFC) chip, a global positioning system (GPS) chip, a wireless fidelity (WiFi) chip, a Bluetooth chip, a Wideband Code Division Multiple Access (WCDMA) chip, a Long-Term Evolution (LTE) chip or a 5G New Radio (NR) chip. In this embodiment, each of the first antenna element 320 and the second antenna element 330 can be a single physical component, but each of the first antenna element 320 or the second antenna element 330 may be implemented as a plurality of components and may perform function described herein.

In this case, the first antenna element 320 and the second antenna element 330 may influence each other by electromagnetic waves, and thus the shield 200 is disposed at one side of the first antenna element 320 in order to block such an influence. The shield 200 serves to prevent the radio waves generated from the first antenna element 320 from influencing the second antenna element 330 by absorbing and reflecting the radio waves generated from the first antenna element 320, and to prevent the radio waves generated from the second antenna element 330 from influencing the first antenna element 320 by blocking the radio waves generated from the second antenna element 330.

Figure 4:
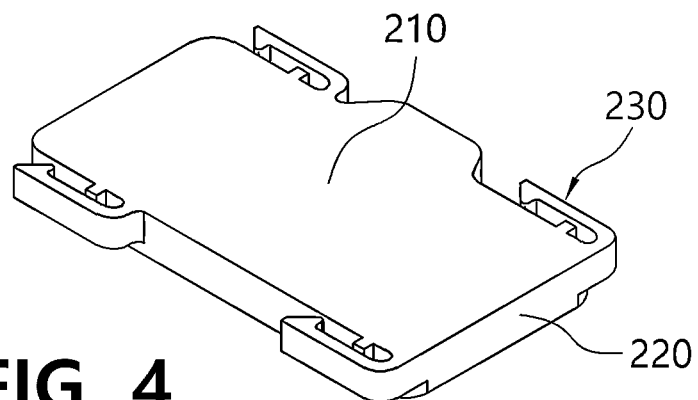
FIG. 4 is one perspective view of a shield of the radar apparatus according to the embodiment of the present disclosure.
Figure 5:
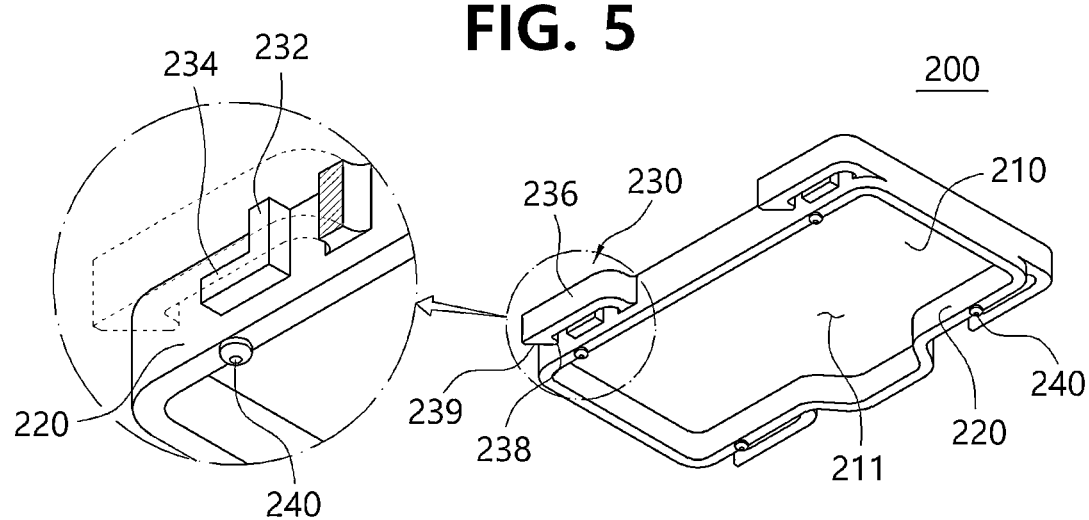
FIG. 5 is another perspective view of the shield of the radar apparatus according to the embodiment of the present disclosure.
Figure 6:
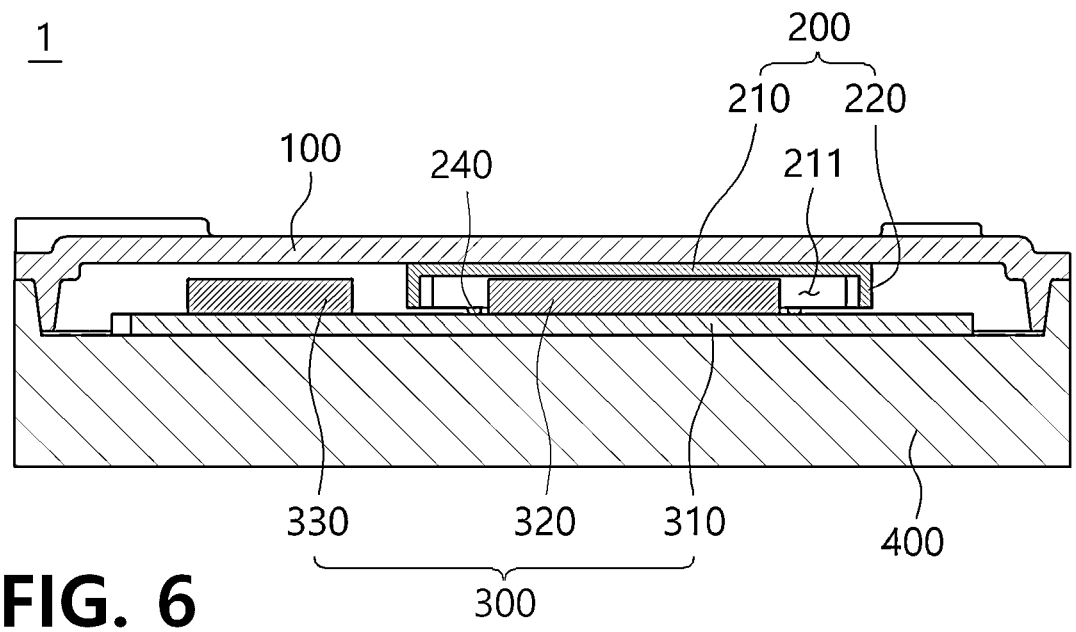
FIG. 6 is a cross-sectional view taken along line A-A' of FIG. 1.

FIG. 4 is one perspective view of the shield of the radar apparatus according to an embodiment of the present disclosure. FIG. 5 is another perspective view of the shield of the radar apparatus according to the embodiment of the present disclosure. FIG. 6 is a cross-sectional view taken along line A-A' of FIG. 1.

Referring to FIGS. 4 to 6, the shield 200 of the radar apparatus 1 according to the embodiment of the present disclosure includes a shielding plate 210, a sidewall 220, one or more couplers 230, and one or more support protrusions 240 in order to prevent the first antenna element 320 or the second antenna element 330 from being influenced by radio waves generated from one another.

As illustrated in FIGS. 4 and 5, the shielding plate 210 is formed in a plate shape and is formed to cover one side of the first antenna element 320. That is, a size of the shield 200 may be determined according to a size of a specific element to be shielded by the shield 200.

Figure 10:
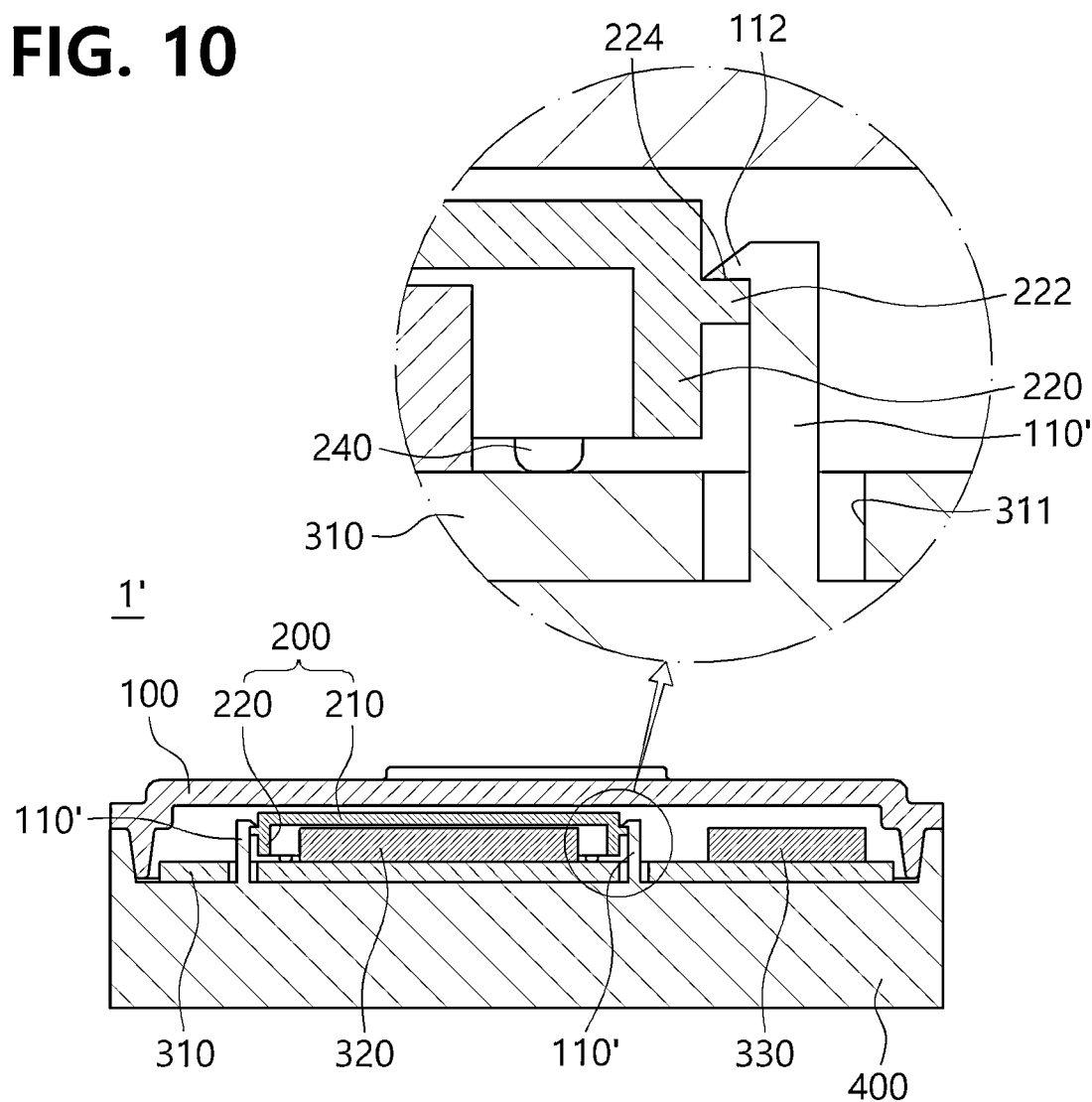
FIG. 10 is a cross-sectional view illustrating an example of a structure in which a shield of a radar apparatus is coupled to a case according to an embodiment of the present disclosure.

In this embodiment, when the shielding plate 210 can cover the first antenna element 320, there is no limitation on a distance between the shielding plate 210 and the radome 100. For example, as illustrated in FIG. 6, an outer surface of the shielding plate 210 may be in contact with an inner surface of the radome 100. Alternatively, as illustrated in FIGS. 10 and 11, the inner surface of the radome 100 and the outer surface of the shielding plate 210 may be spaced apart from each other.

The sidewall 220 protruding toward the first antenna element 320 is formed on a periphery of the shielding plate 210. Accordingly, an accommodating space 211 surrounded by the sidewall 220 is formed at one side of the shielding plate 210.

As illustrated in FIG. 6, an end portion of the first antenna element 320 facing the radome 100 is disposed in the accommodating space 211. That is, the first antenna element 320 is accommodated in the accommodating space 211 and the second antenna element 330 is disposed outside the shield 200. Accordingly, the radio waves emitted in a lateral direction between the first antenna element 320 and the second antenna element 330 can also be blocked, and thus it is possible to further reduce the influence of radio waves on each other.

The support protrusion 240 is formed on an end portion of the sidewall 220 facing the circuit board 310, as illustrated in FIGS. 4 and 5. The support protrusion 240 may be formed as a plurality of the support protrusions along the sidewall 220. For example, as illustrated in FIGS. 4 and 5, when the shielding plate 210 is formed in a quadrangular plate shape, four support protrusions 240 may be formed to protrude near four vertices in order more firmly support the shielding plate 210.

The support protrusions 240 may be supported by being in contact with the circuit board 310, through which the shielding plate 210 can be fixed between the radome 100 and the circuit board 310 in the internal space formed by the radome 100 and the case 400.

In this embodiment, the shield 200 and the support protrusions 240 may be formed of a conductive material. Further, a ground terminal may be disposed on the circuit board 310 at a point where the support protrusion 240 is in contact therewith. Accordingly, even when a current flows through the shield 200 as the support protrusion 240 is in contact with the circuit board 310, an unexpected short of other elements mounted on the circuit board 310 can be prevented.

Meanwhile, the shield 200 is coupled to the radome 100 and is in contact with the circuit board 310 using the support protrusions 240, and in order for the shield 200 to be coupled to the radome 100, the coupler 230 coupled to the protrusion 110 on the radome 100 is provided on the sidewall 220.

The number of the couplers 230 may be the same as the number of the protrusions 110 to which the couplers 230 are coupled, and there is no limitation on the number of the couplers 230.

The couplers 230 are formed at positions corresponding to the protrusions 110 protruding from an inside of the radome 100, as illustrated in FIG. 3. In this embodiment, the couplers 230 and the protrusions 110 may be formed in pairs on both sides of the shield 200 to face each other. Accordingly, both sides of the shield 200 may be supported by one pair of couplers 230 and thus the shield 200 can be more stably supported.

Further, for example, as illustrated in FIG. 4, the couplers 230 provided in the shielding plate 210 having a quadrangular plate shape may be provided as two pairs of couplers 230 so as to be coupled to two pairs of protrusions 110.

The two pairs of protrusions 110 are formed on both sides of one end portion of the shield 200 and formed on both sides of the other end portion of the shield 200. Corresponding to the above-described configuration, the two pairs of couplers 230 are also formed on both sides of one end portion of the shield 200 and both sides of the other end portion of the shield 200.

In this embodiment, by arranging the couplers 230 and the protrusions 110 on both sides of the shield 200, the coupler 230 may be easily coupled to the protrusion 110 by moving the shield 200 in one direction on the inner surface of the radome 100. This will be described further in detail with reference to FIGS. 7, 8, and 9.

Figure 7:
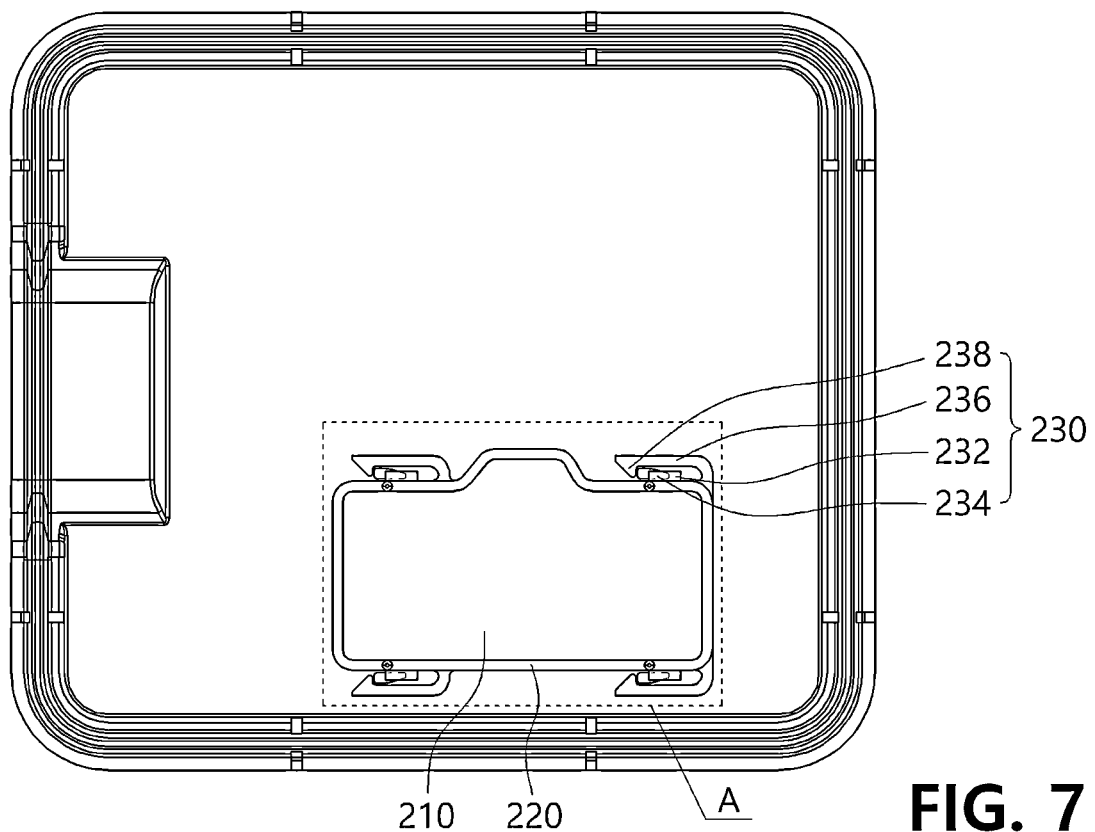
FIG. 7 is a view illustrating a state in which a shield of a radar apparatus is coupled to a radome according to an embodiment of the present disclosure.
Figure 8:
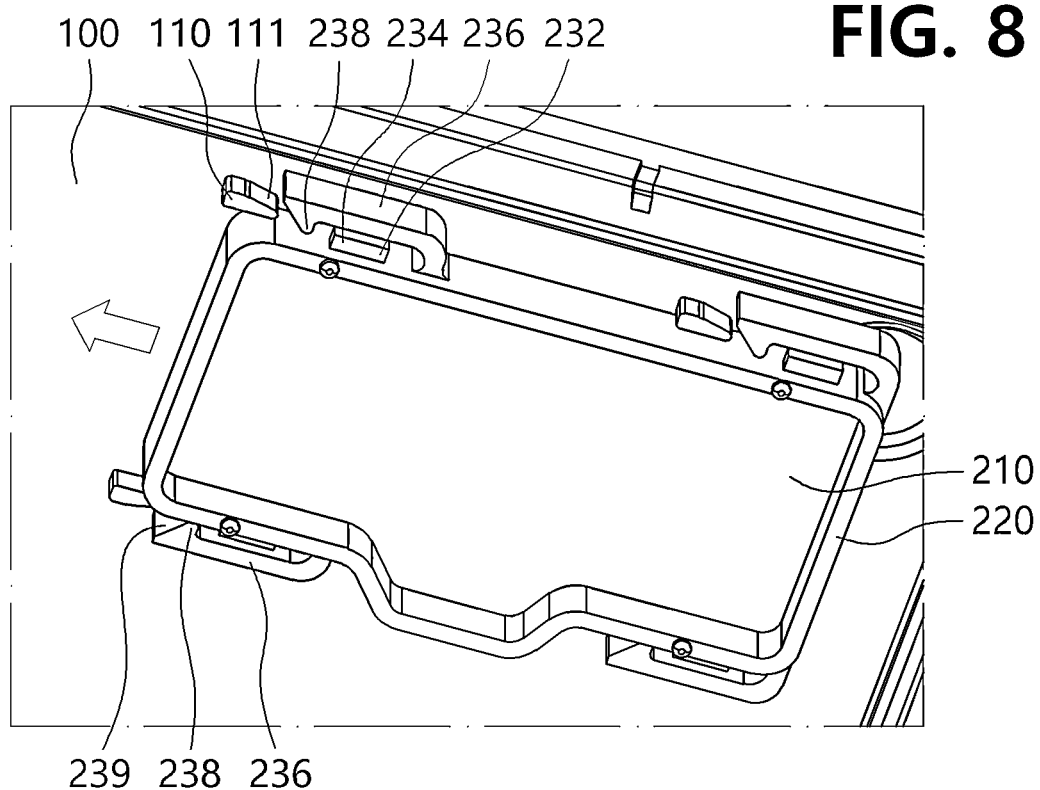
FIG. 8 is an enlarged view of region A of FIG. 7, which illustrates a state in which the shield of the radar apparatus is provided to be installed according to an embodiment of the present disclosure.
Figure 9:
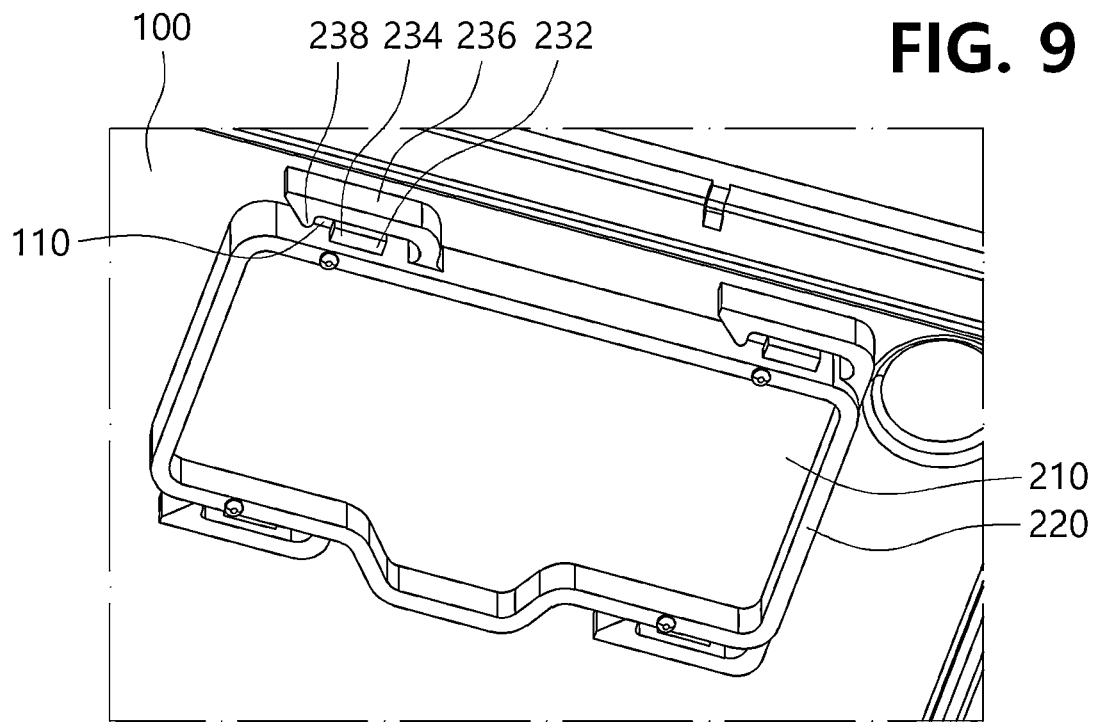
FIG. 9 is an enlarged view of region A of FIG. 7, which illustrates a state in which the shield of the radar apparatus is installed according to an embodiment of the present disclosure.

FIG. 7 is a view illustrating a state in which a shield of a radar apparatus is coupled to radome according to the embodiment of the present disclosure. FIG. 8 is an enlarged view of region A of FIG. 7 illustrating a state in which the shield of the radar apparatus is provided to be installed according to the embodiment of the present disclosure. FIG. 9 is an enlarged view of region A of FIG. 7 illustrating a state in which the shield of the radar apparatus is installed according to the embodiment of the present disclosure.

Referring to FIGS. 7, 8, and 9, the coupler 230 of the radar apparatus 1 according to an embodiment of the present disclosure includes a first stopper 232, a second stopper 234, an elastic body 236, and a fixing protrusion 238.

The elastic body 236 may be configured to elastically press the protrusion 110, disposed outside the sidewall 220, toward the sidewall 220 to allow the shield 200 to be coupled to the radome 100. To this end, as illustrated in FIG. 8, the elastic body 236 is formed to protrude from the sidewall 220 and to be bent along the sidewall 220 in one direction.

Accordingly, an end portion of the bent elastic body 236 is disposed parallel to the sidewall 220, and a space is formed between the end portion of the elastic body 236 and the sidewall 220. The protrusion 110 is inserted and disposed between the end portion of the elastic body 236 and the sidewall 220, and the protrusion 110 is formed to have a width greater than a distance between the end portion of the elastic body 236 and the sidewall 220, and thus, when the protrusion 110 is inserted into the space between the end portion of the elastic body 236 and the sidewall 220 as illustrated in FIG. 7, the elastic body 236 is elastically deformed to press an outer surface of the protrusion 110. That is, the elastic body 236 can press the outer surface of the protrusion 110 to prevent the shield 200 from being separated from the radome 100.

The protrusions 110, which are formed on the radome 100 to be coupled to the couplers 230, are inserted between the end portion of the elastic body 236 and the sidewall 220 by moving in a direction opposite to a direction in which the elastic body 236 is bent, as illustrated in FIG. 8. A protrusion guide surface 111 is formed at an end portion of the protrusion 110 towards the elastic body 236 so that the protrusion 110 can be easily inserted between the end portion of the elastic body 236 and the sidewall 220. The protrusion guide surface 111 may be formed at one side surface or both side surfaces of the protrusion 110.

As illustrated in FIG. 8, the protrusion guide surface 111 is formed to be inclined in one direction from an end portion of the side of the protrusion 110 in a direction opposite to the one direction in which the elastic body 236 is bent. Accordingly, the elastic body 236 is configured to be elastically deformable to press the protrusion 110 by moving the protrusion 110 in one direction in which the elastic body 236 is bent while the protrusion guide surface 111 and a front end of the elastic body 236 are in contact with each other.

In this case, as illustrated in FIG. 8, the fixing protrusion 238 protruding toward the sidewall 220 is provided at the front end of the elastic body 236 in order to prevent the protrusion 110 from being separated from between the elastic body 236 and the sidewall 220 in a state in which the protrusion 110 is disposed between the elastic body 236 and the sidewall 220 and is pressed by the elastic body 236.

Accordingly, when the protrusion 110 is disposed between the elastic body 236 and the sidewall 220, the end portion of the side of the protrusion 110 may be supported by the fixing protrusion 238 in one direction, and thus it is possible to prevent the protrusion 110 from being separated in one direction.

In this embodiment, a fixing protrusion guide surface 239 is formed on the fixing protrusion 238, as illustrated in FIG. 8. The fixing protrusion guide surface 239 is formed to be inclined in a direction in which the protrusion 110 is inserted and guides the protrusion 110 to be movable between the elastic body 236 and the sidewall 220. In particular, the fixing protrusion guide surface 239 comes into contact with the protrusion guide surface 111 to guide the insertion of the protrusion 110.

Accordingly, even when the fixing protrusion 238 protrudes, the protrusion 110 moves so that the fixing protrusion 238 is pushed outward together with the elastic body 236 to guide the elastic deformation of the elastic body 236, and thus the protrusion 110 may be disposed between the sidewall 220 and the elastic body 236.

In this case, as illustrated in FIG. 5, in order to prevent the end portion of the side of the protrusion 110 in a direction opposite to one direction, in which the elastic body 236 is bent, from moving in the direction opposite to the one direction, in which the elastic body 236 is bent, in the space between the elastic body 236 and the sidewall 220, the first stopper 232 protruding from the sidewall 220 toward the elastic body 236 is provided. A position at which the first stopper 232 protrudes may vary according to the size of the protrusion 110.

As illustrated in FIG. 7, in the state in which the protrusion 110 is positioned between the elastic body 236 and the sidewall 220, the fixing protrusion 238 supports an end portion at one side of the protrusion 110 and the first stopper 232 supports an end portion at the other side of the protrusion 110, and thus the protrusion 110 is fixed between the elastic body 236 and the sidewall 220 so as not to move in one direction or a direction opposite thereto.

Meanwhile, as illustrated in FIG. 5, the shielding plate 210 of the shield 200 may be disposed to be spaced apart from the inner surface of the radome 100 as necessary, and the second stopper 234 may protrude from the first stopper 232 in one direction in order to provide or control a distance between the shielding plate 210 and the inner surface of the radome 100.

The second stopper 234 protrudes from an end portion of the first stopper 232 at the side facing the circuit board 310, and an end surface of the protrusion 110 of the radome 100 at the side facing the circuit board 310 is supported by the second stopper 234. Accordingly, when a length from the shielding plate 210 to the second stopper 234 is smaller than a length from the inner surface of the radome 100 to a front end of the protrusion 110, the shield 200 can be fixed to the radome 100 while the shielding plate 210 is spaced apart from the radome 100 by a length obtained by subtracting the length from the shielding plate 210 to the second stopper 234 from the length from the inner surface of the radome 100 to the front end of the protrusion 110.

Hereinafter, a process in which the shield 200 is coupled to the radome 100 will be described in detail with reference to FIGS. 8 and 9.

As illustrated in FIG. 8, the shielding plate 210 of the shield 200 is disposed to face the inner surface of the radome 100. In this case, the fixing protrusion 238 of the coupler 230 of the shield 200 is disposed to face the protrusion 110. In the above situation, when the shielding plate 210 is slid in one direction as illustrated in FIG. 8, the protrusion 110 and the fixing protrusion 238 come into close contact with each other. In this case, the protrusion guide surface 111 of the protrusion 110 and the fixing protrusion guide surface 239 of the fixing protrusion 238 come into contact with each other, and the protrusion 110 is pushed and enters the space between the elastic body 236 and the sidewall 220.

In this case, the elastic body 236 is configured to be elastically deformable, and when the protrusion 110 is disposed between the fixing protrusion 238 and the first stopper 232, as illustrated in FIG. 9, the elastic body 236 can be elastically restored to its original shape thereby pressing the outer surface of the protrusion 110. Accordingly, the protrusion 110 is coupled to the coupler 230, and the state in which the shield 200 is coupled to the radome 100 is maintained.

FIG. 10 is a cross-sectional view illustrating an example of a structure in which a shield of a radar apparatus is coupled to a case according to another embodiment of the present disclosure. FIG. 11 is a cross-sectional view illustrating another example of a structure in which a shield of a radar apparatus is coupled to a case according to another embodiment of the present disclosure. Hereinafter, the same content as that of the embodiments of the present disclosure described above will be omitted and structures in which the shield is coupled to the case will be mainly described as a difference.

A radar apparatus 1' according to another embodiment of the present disclosure may include a radome 100, a shield 200, an antenna 300, and a case 400.

As illustrated in FIG. 10, in the radar apparatus 1' according to another embodiment of the present disclosure, the shield 200 is detachably coupled to the case 400 unlike in the radar apparatus 1 according to the embodiment of the present disclosure. To this end, a protrusion 110' protruding from an inner surface of the case 400 toward a circuit board 310 is provided in the case 400.

In this embodiment, since the inner surface of the case 400 is disposed adjacent to a surface at the other side of the circuit board 310, the protrusion 110' is disposed to pass through the circuit board 310 to face, from a surface at the other side of the circuit board 310, toward one surface in order for the shield 200 disposed on the surface of one side of the circuit board 310 to be coupled to the protrusion 110' of the case 400.

In this embodiment, in order for the protrusion 110' to pass through the circuit board 310, a through-hole 311 through which the protrusion 110' passes is formed in the circuit board 310 at a position corresponding to the protrusion 110'. A shape of the through-hole 311 is not limited as long as the protrusion 110' can pass therethrough.

As illustrated in FIG. 10, the shield 200 is coupled to a front end of the protrusion 110'. To this end, an engaging portion 112 protruding toward a sidewall 220 of the shield 200 is formed at the front end of the protrusion 110' of the shield 200. One surface of the engaging portion 112 at a side towards the case 400 is supported by an engaging surface 224 formed on the sidewall 220 of the shield 200.

Accordingly, the shield 200 is fixed to the case 400 while supported by the engaging portion 112. That is, the shield 200 may be supported by a support protrusion 240 in contact with the circuit board 310 in one direction and may be supported by the engaging portion 112 in contact with the engaging surface 224 in the other direction, and thus the shield 200 may be firmly fixed to the case 400.

In this embodiment, as illustrated in FIG. 10, the engaging surface 224 of the radar apparatus 1' according to another embodiment of the present disclosure may be one surface of the engaging protrusion 222 toward a direction opposite to a direction toward the circuit board 310 which protrudes from the sidewall 220 of the shield 200. Accordingly, the engaging surface 224 may come into contact with the engaging portion 112 of the protrusion 110'.

Alternatively, as illustrated in FIG. 11, the engaging surface 224 of the radar apparatus 1' according to another embodiment of the present disclosure may be one surface, which is formed inside an engaging groove 223 recessed from the sidewall 220 of the shield 200, at a side towards the circuit board 310. Accordingly, one side of the engaging portion 112 may come into contact with the engaging surface 224 in a state in which the engaging portion 112 of the protrusion 110' is inserted into the engaging groove 223.

Although radar apparatuses according to various embodiments of the present disclosure have been described above, the radar apparatuses according to the embodiments of the present disclosure are not applicable only to automobiles, and those skilled in the art to which the present disclosure pertains will clearly understand that the radar apparatus can be used in various technical fields requiring measurement of distance, direction, and the like.

In the radar apparatus according to some embodiments of the present disclosure, a shielding plate can be easily installed in a radome without a separate screw or separate equipment.

In the radar apparatus according to certain embodiments of the present disclosure, by providing a structure in which a shielding plate and a radome can be coupled, manufacturing time and manufacturing cost can be reduced by simplifying a coupling structure of the shielding plate and the radar apparatus.

However, conventionally, a shielding plate has been installed in a radar apparatus by coupling the shielding plate to a circuit board using a screw or by fusing the shielding plate to a radome using ultrasonic waves. When the radome is installed on the shielding plate using the screw as described above, there has been a problem that not only the circuit board can be damaged by the screw, but also a screw fastening operation may be included in a manufacturing process, thereby increasing the time and cost of the manufacturing process. When the shielding plate is fused to the radome using ultrasonic waves, there is a possibility that foreign substances, particularly, foreign substances in a powder form, may be generated during the manufacturing process, and thus an unexpected short can occur on the circuit board. Further, since ultrasonic waves should be used in the manufacturing process, a separate ultrasonic generator is required, and there has been a problem that the time and cost of the manufacturing process increase similarly to the method using the screw. However, various embodiments of the present disclosure described above can solve the problems of the conventional art.

The effects of the present invention are not limited to the above-described effects, and it should be understood that all possible effects deduced from a configuration of the present invention described in detailed descriptions and the claims are included.

While exemplary embodiments of the present invention have been described above, in addition to the above-described embodiments, the fact that the present invention can be embodied in other specific forms without departing from the spirit or scope is apparent to those skilled in the art. Therefore, the above-described embodiments are to be regarded as illustrative rather than restrictive, and accordingly, the present invention is not limited to the above description, but may be modified within the scope of the appended claims and their equivalents.

What is claimed is:

1. A radio detection and ranging (radar) apparatus comprising:
    an antenna module including first and second antenna elements configured to transmit and/or receive radio waves, and a plate-shaped circuit board having one surface on which the first and second antenna elements are mounted;
    a radome covering the one surface of the circuit board and including a protrusion protruding from an inner surface of the radome;
    a shield covering the first antenna element and including a coupler configured to be detachably coupled to the protrusion of the radome; and
    a case coupled to the radome to cover another surface of the circuit board,
    wherein the coupler of the shield includes an elastic body formed on an outer surface of the shield at a position corresponding to the protrusion of the radome, and the protrusion of the radome is disposed between the elastic body of the coupler and the outer surface of the shield.

2. The radar apparatus of claim 1, wherein the shield includes:
    a plate-shaped shielding plate; and
    a sidewall protruding from a periphery of the shielding plate to one side of the shielding plate to form an accommodating space at the one side of the shielding plate,
    wherein the coupler is formed on an outer circumferential surface of the sidewall of the shield.

3. The radar apparatus of claim 2, wherein the first antenna element is disposed inside the accommodating space formed by the sidewall of the shield and the second antenna element is disposed outside the accommodating space formed by the sidewall of the shield.

4. The radar apparatus of claim 2, wherein the elastic body of the coupler is formed on an outer surface of the sidewall of the shield and is configured to elastically press the protrusion of the radome toward the sidewall of the shield.

5. The radar apparatus of claim 4, wherein:
    the protrusion of the radome and the coupler of the shield are formed as a plurality of protrusions and a plurality of couplers;
    two or more of the plurality of protrusions of the radome are each disposed on one of two sides of the sidewall of the shield; and
    two or more of the plurality of couplers of the shield are each disposed to correspond to positions of the two or more of the plurality of protrusions of the radome, and are each formed on one of the two sides of the sidewall of the shield to face each other.

6. The radar apparatus of claim 4, wherein:
    the elastic body of the coupler of the shield protrudes from the sidewall of the shield and is bent in one direction; and
    the protrusion of the radome is configured to be movable in a direction opposite to the one direction in which the elastic body of the coupler of the shield is bent and is disposed between the elastic body of the coupler of the shield and the outer surface of the sidewall of the shield.

7. The radar apparatus of claim 6, wherein the protrusion of the radome includes a protrusion guide surface configured to guide the protrusion of the radome between the elastic body of the coupler of the shield and the outer surface of the sidewall of the shield when the protrusion of the radome moves in the direction opposite to the one direction in which the elastic body of the coupler of the shield is bent.

8. The radar apparatus of claim 6, wherein the coupler further includes a fixing protrusion protruding from a front end of the elastic body of the coupler of the shield toward the sidewall of the shield.

9. The radar apparatus of claim 8, wherein the fixing protrusion of the coupler includes a fixing protrusion guide surface configured to guide the protrusion of the radome.

10. The radar apparatus of claim 6, wherein the coupler further includes a first stopper protruding from the outer surface of the sidewall of the shield toward the elastic body of the coupler of the shield to limit a movable range of the protrusion.

11. The radar apparatus of claim 10, wherein the coupler further includes a second stopper supporting an end surface of the protrusion of the radome which is positioned at a side facing the shield.

12. The radar apparatus of claim 11, wherein the second stopper of the coupler extends from the first stopper in the one direction in which the elastic body of the coupler of the shield is bent.

13. The radar apparatus of claim 11, wherein the second stopper of the coupler has a length from the shielding plate to the second stopper, which is shorter than a length from the inner surface of the radome to the end surface of the protrusion which is positioned at the side facing the shield so that the shielding plate is spaced apart from the inner surface of the radome.

14. The radar apparatus of claim 2, wherein the shield further includes a support protrusion protruding from an end portion of the sidewall of the shield, which is positioned at a side facing the circuit board, toward the circuit board to support the circuit board.

15. The radar apparatus of claim 14, wherein the support protrusion of the shield has a cross-sectional area reduced toward the circuit board.

16. The radar apparatus of claim 14, wherein the support protrusion of the shield is in contact with a ground terminal included in the antenna module.

17. The radar apparatus of claim 1, wherein the first antenna element is a radio-frequency integrated circuit (RFIC) chip.

18. A radio detection and ranging (radar) apparatus comprising:
    an antenna module including first and second antenna elements configured to transmit or receive radio waves, and a plate-shaped circuit board having a through-hole and one surface on which the first and second antenna elements are mounted;

a radome covering the one surface of the circuit board;

a case coupled to the radome and covering another surface of the circuit board, the case including a protrusion protruding from an inner surface of the case and passing through the through-hole of the circuit board of the antenna module; and a shield covering the first antenna element and detachably coupled to the protrusion of the case.

19. The radar apparatus of claim 18, wherein the shield includes:

a plate-shaped shielding plate; and a sidewall protruding from a periphery of the shielding plate toward one side of the shielding plate to form an accommodating space at the one side of the shielding plate, wherein an engaging surface is formed on an outer circumferential surface of the sidewall, wherein the protrusion of the case is disposed on an outside of the sidewall of the shield and includes an engaging portion formed at a front end of the protrusion of the case and protruding toward the sidewall of the shield to be supported by the engaging surface of the sidewall of the shield.

20. The radar apparatus of claim 19, wherein the engaging surface of the sidewall of the shield is one surface of an engaging protrusion protruding from the sidewall of the shield, or one inner surface of an engaging groove recessed from the sidewall of the shield.

\* \* \* \* \*